United States Patent [19]

Goel

[11] Patent Number: 4,751,103

[45] Date of Patent: Jun. 14, 1988

[54] EPOXY PRIMERS FOR POLYURETHANE STRUCTURAL ADHESIVES

[75] Inventor: Anil B. Goel, Worthington, Ohio

[73] Assignee: Ashland Oil, Inc., Ashland, Ky.

[21] Appl. No.: 930,205

[22] Filed: Nov. 13, 1986

[51] Int. Cl.$^4$ .......................... B05D 3/06; B05D 5/10; B32B 27/38; B32B 27/40

[52] U.S. Cl. ................... 427/54.1; 427/207.1; 427/208.8; 428/414; 428/423.1

[58] Field of Search ................ 427/54.1, 207.1, 208.4, 427/208.8, 208.2; 428/414, 423.1

[56] References Cited

U.S. PATENT DOCUMENTS

| | | | |
|---|---|---|---|
| 3,068,117 | 12/1962 | Korpman | 428/414 |
| 4,073,998 | 2/1978 | O'Connor | 428/414 |
| 4,218,279 | 8/1980 | Green | 427/54.1 |
| 4,246,298 | 1/1981 | Guarnery et al. | 427/54.1 |
| 4,289,595 | 9/1981 | Tortorello | 427/54.1 |
| 4,307,140 | 12/1981 | Davis | 428/414 |
| 4,318,766 | 3/1982 | Smith | 427/54.1 |
| 4,378,277 | 3/1983 | Smith | 427/54.1 |
| 4,394,403 | 7/1983 | Smith | 427/54.1 |
| 4,504,374 | 3/1985 | Lewarchik et al. | 427/54.1 |
| 4,595,445 | 1/1986 | Hombach et al. | 427/207.1 |
| 4,657,779 | 4/1987 | Gaske | 427/54.1 |

*Primary Examiner*—Michael R. Lusignan
*Assistant Examiner*—Marianne L. Padgett
*Attorney, Agent, or Firm*—John F. Jones

[57] ABSTRACT

A process for forming an improved bond between surfaces of sheet molding compound (SMC) and polyurethane adhesives comprising priming the surface with a liquid epoxy resin which is 100% active wherein the epoxy resin contains at least one ultraviolet light activated cure accelerator, exposing the primed surface to ultraviolet radiation so as to cause curing of the primer, then applying the polyurethane adhesive to the primed, cured surface and curing the polyurethane adhesive.

12 Claims, No Drawings

EPOXY PRIMERS FOR POLYURETHANE STRUCTURAL ADHESIVES

This invention relates to epoxy resin primers for polyurethane structural adhesives and more particularly pertains to a process for improving the bonding of polyurethane structural adhesives in the adhesion of sheet molding compounds to themselves and to other substrates by means of epoxy resin primers which are 100% active material and are curable with ultraviolet light and are free of any of the commonly employed solvents.

The urethane adhesives described in the prior art for bonding sheet molding compound (SMC which are fiberglass reinforced unsaturated polyester composites which have been cured in the form of sheets and other structural forms) substrates generally require surface preparation of the substrate such as priming in order to obtain good adhesive bonds. Primers described in the prior art are generally solvent-based, the evaporation of which solvent often causes problems of bubble formation, pollution, flammability and toxicity to the workers involved in the operation. The process of the present invention employs 100% reactive epoxy resin primers which are cured completely by exposure to ultra violet radiation in a matter of seconds which provide primed surfaces on the substrates which are ready to be treated with a polyurethane structural adhesive within seconds of the time of application of the primer. No toxic, flammable or polluting vapors are emitted from the primer in this operation all of which are known to be hazards which must be avoided in the workplace. The primed surfaces provided by the process of this invention when bonded with urethane adhesives show excellent adhesion properties desired in structural adhesive applications.

The commonly used SMC primers for polyurethane structural adhesives described in the prior art are generally based on non-flammable but toxic halocarbon solvents. There is a need for a 100% reactive primer for SMC substrates which eliminates the evaporation problem and can be applied by simply wiping on the substrate in the form of a thin film to provide a uniform and consistent surface for bonding, particularly, for highly flexible urethane adhesives. Furthermore, the material used for priming after application must desirably be cured within a short period of time (few seconds to a minute or so) to give a bubble-free, non-tacky film and of course must be compatible with the structural adhesives. Thus the primed surface can be bonded at any time after priming without the loss of adhesion performance caused by surface contamination such as dust deposition, etc., which is not the case with the non-cured primers described in copending U.S. patent application Ser. No. 877,499, filed on 7/21/86. The present invention represents an improvement over that disclosed and claimed in the above-mentioned copending patent application.

I have discovered that certain epoxy resins when mixed with UV curable accelerators (generally the cationic catalysts) can be used as 100% reactive and non-volatile primers which cure rapidly (within a few seconds) when exposed to (irradiated with) ultra violet light. A variety of polyepoxide resins which may contain hydrocarbon, ether and/or ester groups in the backbone can be used for this application; however, low viscosity epoxy resins are particularly useful because of their good spreading property to give a fine film when applied to the substrate.

The epoxy resins, or polyepoxides, useful in this invention can be monomeric or polymeric, saturated or unsaturated, aliphatic, cycloaliphatic, aromatic or heterocyclic, and they may be substituted if desired with other substitutents besides the epoxy groups, e.g., hydroxyl groups, ether radicals, halogen atoms, and the like.

Typical polyepoxides suitable in the practice of this invention include those disclosed in U.S. Pat. Nos. 2,500,600 and 2,324,483 which are incorporated herein by reference. Preferred in this invention are 1,2-epoxy compounds having an epoxide equivalence greater than 1, that is to say, compounds containing more than one group of the formula

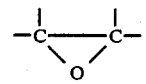

The 1,2-epoxide groups may be either terminal or inner ones. Particularly suitable terminal 1,2-epoxide groups are 1,2-epoxy ethyl or 1,2-epoxy propyl groups. The latter may be linked to an oxygen atom, that is to say, they are glycidyl ether or glycidyl ester groups. Compounds with inner epoxide groups usually contain the 1,2-epoxide group in an aliphatic chain or in a cycloaliphatic ring. As polyepoxides containing an inner 1,2-epoxy group there are 1 suitable epoxidized diolelfins, dienes, or cylic dienes, such as 1,2,5,6-diepoxy hexane, 1,2,4,5-diepoxy cyclohexane, dicyclopentadiene diepoxide, dipentene diepoxide, vinyl cyclohexene diepoxide, epoxidized diolefinically unsaturated carboxylic acid esters, such as methyl-9,10,12,13-diepoxy stearate or the dimethyl ester of 6,7,10,11-diepoxyhexadecane-1,16-dicarboxylic acid. Furthermore, there may be mentioned epoxidized mono-, di-, or polyesters, and mono-, di-, or polyacetals containing at least one cycloaliphatic five-membered or six-membered ring, to which at least two 1,2-epoxidized groups are linked.

A widely used class of polyepoxides which can be used in the present invention are the epoxy polyethers obtained by reacting a halogen containing epoxide or dihalohydrin, such as epichlorohydrin, epibromohydrin, 3-chloro-1,2-epoxyoctane, and the like with either a polyhydric phenol or a polyhydric alcohol. Preferred polyepoxides for the purposes of this invention are those which are liquids ambient temperatures.

The polyurethane adhesives useful in this invention are those prepared by reaction of a polyol with a polyisocyanate.

Polyols useful in this invention in the preparation of the polyurethane adhesives are those having at least two hydroxyl groups per molecule and having equivalent weights falling in the range of from 20 to 5000. Specific polyols include butane diol, cyclohexane dimethanol, tripropylene glycol, amide diols, urethane diols, polyether polyols, polyester polyols, and the like.

Polyhydroxy polyethers are suitable and preferably those having at least two hydroxyl groups per molecule. Polyhydroxy polyethers can be prepared by polymerization of epoxides such as ethylene oxide, propylene oxide, butylene oxide, tetrahydrofuran, styrene oxide, or epichlorohydrin either on their own or by chemical addition to other materials. Suitable other materials include ethylene glycol, propylene glycol, trimethylol propanes and 4,4'-dihydroxy diphenyl propane. Sucrose polyethers also may be used. Polybutadienes having hydroxyl groups as well as other known hydroxyl containing vinyl addition polymerized polymers can be used. According to the present invention, hydroxyl containing polyesters, polythioethers, polyacetals, polycarbonates or polyesteramides of the types known for formation of polyurethanes may also be used.

The polyisocyanates useful in preparing the polyurethane adhesives for this invention include organic isocyanates having at least two isocyanate groups per molecule. The polyisocyanates can be of low, high or intermediate molecular weight and can by any of a wide variety of organic polyisocyanates including ethylene diisocyanate, trimethylene diisocyanate, dodecamethylene diisocyanate, hexamethylene diisocyanate, hexamethylene diisocyanate trimer, tetraethylene diisocyanate, pentamethylene diisocyanate, propylene-1,2-diisocyanate, 1,4-diisocyanato cyclohexane, cyclopentene-1,3-diisocyanate, p-phenylene diisocyanate, 1-methyl phenylene-2,4-diisocyanate, naphthalene-1,4-diisocyanate, toluene diisocyanate, diphenyl-4,4'-diisocyanate, xylylene-1,3-diisocyanate, 4,4'-diphenylene methane diisocyanate, 4,4'-diphenylene propane diisocyanate, 1,2,3,4-tetraisocyanato butane, butane-1,2,3-triisocyanate, polymethylene polyphenyl isocyanate, and other polyisocyanates having an isocyanate functionality of at least two more fully disclosed in U.S. Pat. Nos. 3,350,362 and 3,382,215. Polyisocyanates which are polymeric in nature including isocyanate prepolymers of all types are included in this invention.

The liquid epoxy resin primer used in this invention should be mixed with at least one ultra violet light activated cure accelerator and such accelerators include diaryl anions such as $Ar_2I^+X^-$ and $Ar_3S^+X^-$ wherein Ar represents an aromatic hydrocarbon group having from 6 to 20 carbon atoms and X represents $BF_4$, $PF_6$, $AsF_6$ or $SbF_6$. Other accelerators mentioned in U.S. Pat. No. 4,374,066 are also useful in the practice of this invention. The catalyst should be used in amounts in the range of from about 0.2 to 10% and preferably, from about 0.5 to about 5% by weight of the total polyepoxide primer. The primer can be applied to the substrate in various thickness films ranging from 0.001 to 1 mil or more and preferably from 0.002 to 0.1 mil. The priming step can be repeated without adversely affecting the performance and properties of the adhesive bond. The primer can be conveniently be applied simply by wiping the primer liquid onto the SMC substrate by means of a soft cloth or tissue paper and the primer cures within a few seconds when exposed to UV irradiation to give a hard, non-tacky film. The primed SMC parts when adhered together using a urethane adhesive, show excellent adhesion performance under various environmental test conditions.

This invention is further illustrated in the following representative examples.

EXAMPLE 1

An isocyanate-terminated prepolymer was made by reacting 44 parts by weight of polypropylene ether glycol of approximately 2000 molecular weight in a reactor equipped with a mechanical stirrer, a thermometer with a temperature controller, a nitrogen inlet and vacuum connection with 13.5 parts by weight of oligomeric methylene bis(phenyl isocyanate) (NCO functionality of 2.7 per molecule) and 23.7 parts by weight of liquid methylene bis(phenyl isocyanate) (NCO functionality of 2.1 per molecule). This prepolymer was filled with 23.5 parts by weight of dry talc and was degassed to give a creamy gravity flowable product.

EXAMPLE 2

A hydroxy-terminated curative was prepared by mixing 53/parts by weight of ethylene oxide capped polypropylene ether tetraol of 125 hydroxy equivalent weight, 29 parts by weight of ethylene oxide capped polypropylene ether tetraol of 490 molecular weight, 2 parts by weight of toluene diisocyanate, 5.5 parts by weight of fumed silica, 1.5 parts by weight of piperazine, and 0.4 parts by weight of triethylene diamine. The resulting mixture was degassed to give a liquid curative having a viscosity of about 10,000 cps.

EXAMPLE 3

The following general procedure was used for priming the SMC parts used for testing in the following examples. The fiberglass reinforced polyester polymer sheet (sheet molding compound also referred to as SMC) prior to the bonding with the polyurethane adhesive was primed by mixing a liquid diepoxy resin, vinyl cyclohexene diepoxide, with 4% by weight of triaryl sulfonium hexafluoro antimonate to give a clear liquid. Two drops of this liquid was put on an SMC sheet substrate which measured 10 inches by 4 inches by 100 mils (thickness) and the polyepoxide liquid was spread (rubbed) with a soft Kimwipe (tissue paper) to cover the surface of the SMC sheet in a very fine (thin) film having an approximate thickness of 0.001 to 0.1 mil. The treated surface was then exposed to UV light generated by a mercury lamp for 30 seconds during which time the liquid polyepoxide cured to give a solid film. A second coat was made on top of the first in the same manner.

EXAMPLE 4

The procedure of Example 3 was followed using as primer a mixture of vinyl cyclohexene diepoxide containing 4% by weight of triphenyl sulfonium hexafluorophosphate. The primer coating was cured for 30 to 60 seconds under the UV light.

EXAMPLE 5

The procedure of Example 3 was followed using a primer solution of 1:1 (by weight) of vinyl cyclohexene diepoxide and liquid diglycidyl ether of Bisphenol-A (epoxy equivalent of triphenyl sulfonium weight of 185) with 4% by weight hexafluoro antimonate. The primer was cured for about 1 minute under the UV light.

EXAMPLE 6 followed using a primer
The procedure of Example 3 was followed using a primer solution composed of a 1:1 weight ratio of vinylcyclohexene diepoxide and diylycidyl ether of cyclohexane dimethanol with 4% by weight of triphenyl sulfonium hexafluoro antimonate. The primer was cared for 50 seconds under UV light.

EXAMPLE 7

The following general procedure was used for preparing the adhesive bonds and testing the adhered samples. The two parts, i.e., the prepolymer of Example 1 and the curative of Example 2, were mixed in about 4:1 weight ratio under an inert atmosphere (nitrogen) to give a sag-resistant adhesive. This adhesive was applied in the form of ⅜ inch thick beads across the SMC substrate surface (both primed and unprimed for comparison). After sprinkling a few 30 mils diameter glass beads on top of the adhesive to obtain a final bond line thickness of 30 mils, the primed surface of the other laminate was placed on top of the first with a one-inch overlap between the sheets. The adhesive bonds were cured in a heated fixture at about 200° F. for 3 minutes under about 1 psi pressure, followed by postcuring in an oven at 285° F. for 30 minutes. Test specimens were cut from these samples into one-inch test strips. The bonds were tested for adhesion in the Lap Shear mode under the test conditions as listed below:

(A) Lap Shear strength at room temperature
(B) Lap Shear strength at 180° F.
(C) Lap Shear strength after seven days at 130° F. water exposure, tested immediately
(D) Lap Shear strength at room temperature after 350° F./1 hour post bake Test results on the various commercially available SMC primed with the primers of Examples 3, 4, 5 and 6 are listed in Tables 1, 2, 3 and 4 respectively. As can be seen, the primed SMC resulted in substrate failure consistently (evidence of strong adhesive bond, stronger than the substrate). Compared to this when unprimed SMC was used, adhesive failure was observed, particularly under test conditions of B and C with strengths of 200 to 400 psi.

TABLE 1

Test Results Using Two Coats of Primer of Example 3

| Sample No. | Test Procedure | Lap Shear Strength (psi) | | | |
|---|---|---|---|---|---|
| | | Phase Alpha | B 950 | GT 7113 | RW 9468 |
| 1 | A | 375 DL | 380 DL | 415 DL | 490 DL |
| 2 | A | 350 DL | 410 DL | 490 DL | 410 DL |
| 3 | A | 470 DL | 360 DL | 490 DL | 430 DL |
| 4 | B | 330 DL | 470 DL | 350 DL | 270 DL |
| 5 | B | 370 DL | 340 DL | 470 DL | 340 DL |
| 6 | B | 370 DL | 410 DL | 475 DL | 365 CF |
| 7 | C | 290 DL | 410 DL | 370 DL | 230 DL |
| 8 | C | 270 DL | 435 DL | 395 DL | 270 DL |
| 9 | C | 265 DL | 400 DL | 385 DL | 280 DL |

Phase Alpha is Ashland Chemical Company's SMC; B 950 is Budd Corporation's laminate; GT 7113 is Diversitech General's laminate; and RW 9468 is Rockwell International's laminate.
DL = Substrate delaminated; CF = Cohesive failure.

TABLE 2

Lap Shear Strength Using One Coat Primer of Example 4

| Sample No | Test Procedure | Lap Shear Strength (psi) | | |
|---|---|---|---|---|
| | | Phase Alpha | GT 7113 | RW 9468 |
| 1 | A | 300 DL | 480 DL | 290 DL |
| 2 | A | 330 DL | 440 DL | 310 DL |
| 3 | A | 345 DL | 420 DL | 355 DL |
| 4 | B | 250 DL | 340 DL | 240 DL |
| 5 | B | 245 DL | 320 DL | 235 DL |
| 6 | B | 270 DL | 275 CF | 220 DL |
| 7 | C | 190 DL | 385 DL | 175 DL |
| 8 | C | 210 DL | 340 DL | 170 DL |
| 9 | C | 190 DL | 350 DL | 230 DL |

TABLE 3

Lap Shear Strength Using One Coat Primer of Example 5

| Sample No | Test Procedure | Lap Shear Strength (psi) | |
|---|---|---|---|
| | | Phase Alpha | RW 9468 |
| 1 | A | 395 DL | 500 DL |
| 2 | A | 420 DL | 590 DL |
| 3 | A | 410 DL | 480 DL |
| 4 | B | 340 DL | 220 CF |
| 5 | B | 280 DL | 245 DL |
| 6 | B | 245 DL | 300 DL |
| 7 | C | 195 DL | 230 DL |
| 8 | C | 205 DL | 210 DL |

TABLE 4

Lap Shear Strength Using One Coat Primer of Example 6

| Sample No | Test Procedure | Lap Shear Strength (psi) | | |
|---|---|---|---|---|
| | | Phase Alpha | GT 7113 | RW 9468 |
| 1 | A | 365 DL | 445 DL | 360 DL |
| 2 | A | 360 DL | 450 DL | 350 DL |
| 3 | A | 360 DL | 440 DL | 355 DL |
| 4 | B | 300 DL | 410 DL | 360 DL |
| 5 | B | 290 DL | 520 DL | 400 DL |
| 6 | B | 310 DL | 500 DL | 370 DL |
| 7 | C | 260 DL | 340 DL | 270 DL |
| 8 | C | 250 FT | 330 DL | 225 DL |
| 9 | C | 255 DL | 345 DL | 280 DL |
| 10 | D | 330 DL | 540 DL | 320 DL |
| 11 | D | 300 DL | 480 DL | 320 DL |
| 12 | D | 320 DL | 490 DL | 325 DL |

I claim:

1. The process for forming an improved bond between at least two surfaces of at least one sheet molding compound substrate material and a polyurethane adhesive comprising priming said surfaces with a solvent free liquid epoxy resin containing at least one ultraviolet light activated accelerator selected from the group consisting of $Ar_2I^+X^-$ and $Ar_3S^+X^-$ wherein Ar represents an aromatic hydrocarbon group having from 6 to 20 carbon atoms and X represents $BF_4$, $PF_6$, $AsF_6$ or $SbF_6$, exposing said primed surface to ultraviolet light radiation to cause curing of the epoxy resin, applying a polyurethane adhesive between the primed, cured surfaces and curing the polyurethane adhesive.

2. The process of claim 1 wherein the substrate material is a fiberglass reinforced polyester structure.

3. The process of claim 2 wherein the liquid epoxy resin is one containing more than one group of the formula

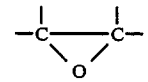

4. The process of claim 3 wherein the ultraviolet light activated cure accelerator is present in from 0.2 to 10% by weight based on the weight of the epoxy resin.

5. the process of claim 4 wherein the polyurethane adhesive is one prepared by reaction of a polyol with a polyisocyanate.

6. The process of claim 5 wherein the surfaces of the substrate is primed with a film ranging from 0.001 to 1 mil in thickness.

7. The process of claim 6 wherein the surfaces are primed with a mixture of vinyl cyclohexene diepoxide and triphenyl sulfonium hexafluoro phosphate.

8. The process of claim 6 wherein the surfaces are primed with a mixture of vinyl cyclohexene diepoxide, liquid diglycidyl ether of Bisphenol-A and triphenyl sulfonium hexafluoro antimonate.

9. The process of claim 6 wherein the surfaces are primed with a mixture of vinyl cyclohexene diepoxide, the diglycidyl ether of cyclohexane dimethanol and triphenyl sulfonium hexafluoro antimonate.

10. The process of claim 7 wherein the polyurethane adhesive is a mixture of a polyurethane prepolymer prepared by reaction of polypropylene ether glycol with methylene bis(phenyl) isocyanate) and a hydroxy-terminated curative prepared by mixing polypropylene ether tetraol, ethylene oxide capped polypropylene ether tetraol, toluene diisocyanate, piperazine and triethylene diamine.

11. The process of claim 8 wherein the polyurethane adhesive is a mixture of a polyurethane prepolymer prepared by reaction of polypropylene ether glycol with methylene bis(phenyl isocyanate) and a hydroxy-terminated curative prepared by mixing polypropylene ether tetraol, ethylene oxide capped polypropylene ether tetraol, toluene diisocyanate, piperazine and triethylene diamine.

12. The process of claim 9 wherein the polyurethane adhesive is a mixture of a polyurethane prepolymer prepared by reaction of polypropylene ether glycol with methylene bis(phenyl isocyante) and a hydroxy-terminated curative prepared by mixing polypropylene ether tetraol, ethylene oxide capped polypropylene ether tetraol, toluene diisocyanate, piperazine and triethylene diamine.

* * * * *